(12) United States Patent
Shibata et al.

(10) Patent No.: US 11,825,395 B2
(45) Date of Patent: Nov. 21, 2023

(54) ROUTE CONTROL METHOD AND ROUTE CONTROL DEVICE

(71) Applicant: NIPPON TELEGRAPH AND TELEPHONE CORPORATION, Tokyo (JP)

(72) Inventors: Naotaka Shibata, Musashino (JP); Hiroyuki Uzawa, Musashino (JP); Yoichi Fukada, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 266 days.

(21) Appl. No.: 17/298,294

(22) PCT Filed: Nov. 28, 2019

(86) PCT No.: PCT/JP2019/046627
§ 371 (c)(1),
(2) Date: May 28, 2021

(87) PCT Pub. No.: WO2020/116317
PCT Pub. Date: Jun. 11, 2020

(65) Prior Publication Data
US 2022/0030500 A1    Jan. 27, 2022

(30) Foreign Application Priority Data
Dec. 4, 2018   (JP) .................................. 2018-227573

(51) Int. Cl.
*H04W 40/02*   (2009.01)
*H04L 45/02*   (2022.01)
*H04L 45/24*   (2022.01)

(52) U.S. Cl.
CPC ............. *H04W 40/02* (2013.01); *H04L 45/02* (2013.01); *H04L 45/24* (2013.01)

(58) Field of Classification Search
None
See application file for complete search history.

(56) References Cited

U.S. PATENT DOCUMENTS 5,933,425 A * 8/1999 Iwata ...................... H04L 45/02
370/395.43
9,998,357 B2 * 6/2018 Gao ...................... H04L 47/125
(Continued)

OTHER PUBLICATIONS

Atsufumi Moriyama et al., A Proposal of Routing Algorithm Dealing with Multiple Metrics and A Study on the Precondition, Institute of Electronics, Information and Communication Engineers Next Generation Network Timed Research Expert Committee Work Shop 2010, Aug. 16, 2010.

*Primary Examiner* — Xavier S Wong
(74) *Attorney, Agent, or Firm* — Harness, Dickey & Pierce, P.L.C.

(57) ABSTRACT

A path control method of controlling a communication path in a network including a plurality of wireless devices communicating with a terminal in a wireless manner and a plurality of wireless control devices communicating with any one of the plurality of wireless devices through a plurality of signal transfer devices includes searching for available communication paths and listing the available communication paths for individual combinations of a wireless device of the plurality of wireless devices and a wireless control device of the plurality of wireless control devices, and selecting a combination of communication paths in which a maximum value of the number of communications passing through the same output port of a signal transfer (Continued)

device of the plurality of signal transfer devices is minimized from among the listed available communication paths.

7 Claims, 19 Drawing Sheets

(56) References Cited

U.S. PATENT DOCUMENTS

| | | | |
|---|---|---|---|
| 10,931,588 B1* | 2/2021 | Matthews | H04L 45/66 |
| 2008/0280616 A1* | 11/2008 | Xu | H04Q 3/66 |
| | | | 455/445 |
| 2010/0254312 A1* | 10/2010 | Kennedy | H04W 40/00 |
| | | | 370/328 |

* cited by examiner

| PROCESS OF SELECTING COMMUNICATION PATH IN RELATED ART | WIRELESS DEVICE A - WIRELESS CONTROL DEVICE S1 | | |
|---|---|---|---|
| | A→SW1→SW2→SW7→SW6→S1 (5 HOPS) | A→SW1→SW2→SW3→SW4→SW5→SW6→S1 (7 HOPS) | A→SW1→SW11→SW10→SW4→SW5→SW6→S1 (7 HOPS) |
| WIRELESS DEVICE B - WIRELESS CONTROL DEVICE S2 | | | |
| B→SW3→SW2→SW7→SW8→S2 (5 HOPS) | GOOD | EXCLUDED | EXCLUDED |
| B→SW3→SW4→SW10→SW9→SW8→S2 (6 HOPS) | GOOD | EXCLUDED | EXCLUDED |
| B→SW3→SW4→SW5→SW6→SW7→SW8→S2 (7 HOPS) | EXCLUDED | EXCLUDED | EXCLUDED |

FIG. 4A

| PROCESS OF SELECTING COMMUNICATION PATH IN PATH CONTROL DEVICE 12 | | WIRELESS DEVICE A - WIRELESS CONTROL DEVICE S1 | | |
|---|---|---|---|---|
| | | A→SW1→SW2→SW7→SW6→S1 (5 HOPS) | A→SW1→SW2→SW3→SW4→SW5→SW6→S1 (7 HOPS) | A→SW1→SW11→SW10→SW4→SW5→SW6→S1 (7 HOPS) |
| WIRELESS DEVICE B - WIRELESS CONTROL DEVICE S2 | B→SW3→SW2→SW7→SW8→S2 (5 HOPS) | GOOD (NUMBER OF COMMUNICATIONS PASSING THROUGH OUTPUT PORT OF SAME SW: 2) | EXCLUDED | EXCLUDED |
| | B→SW3→SW4→SW10→SW9→SW8→S2 (6 HOPS) | GOOD (NUMBER OF COMMUNICATIONS PASSING THROUGH SAME OUTPUT PORT OF SAME SW: 1) | EXCLUDED | EXCLUDED |
| | B→SW3→SW4→SW5→SW6→SW7→SW8→S2 (7 HOPS) | EXCLUDED | EXCLUDED | EXCLUDED |

*FIG. 4B*

| | | WIRELESS DEVICE A - WIRELESS CONTROL DEVICE S1 | A→SW1→SW2→SW7→SW6→S1 (5 HOPS) | A→SW1→SW2→S3→SW4→SW5→SW6→S1 (7 HOPS) | A→SW1→SW11→SW10→SW4→SW5→W6→S1 (7 HOPS) | A→SW1→SW2→SW7→SW6 (5 HOPS) | A→SW1→SW2→SW3→SW4→SW5→SW6→S1 (7 HOPS) | A→SW1→SW11→SW10→SW4→SW5→W6→S1 (7 HOPS) |
|---|---|---|---|---|---|---|---|---|
| FIRST GROUP | | WIRELESS DEVICE C - WIRELESS CONTROL DEVICE S1 | C→SW2→SW7→SW6→S1 (4 HOPS) | | | C→SW2→SW3→SW4→SW5→SW6→S1 (6 HOPS) | | |
| SECOND GROUP | WIRELESS DEVICE B - WIRELESS CONTROL DEVICE S2 | B→SW3→SW2→SW7→SW8→S2 (5 HOPS) | FAIR (NUMBER OF COMMUNICATIONS PASSING THROUGH OUTPUT PORT OF SAME SW: 3) | EXCLUDED | EXCLUDED | GOOD (NUMBER OF COMMUNICATIONS PASSING THROUGH OUTPUT PORT OF SAME SW: 2) (NUMBER OF GROUPS PASSING THROUGH OUTPUT PORT OF SAME SW: 2) | EXCLUDED | EXCLUDED |
| | | B→SW3→SW4→SW10→SW9→SW8→S2 (6 HOPS) | VERY GOOD (NUMBER OF COMMUNICATIONS PASSING THROUGH OUTPUT PORT OF SAME SW: 2) (NUMBER OF GROUPS PASSING THROUGH OUTPUT PORT OF SAME SW: 1) | EXCLUDED | EXCLUDED | GOOD (NUMBER OF COMMUNICATIONS PASSING THROUGH OUTPUT PORT OF SAME SW: 2) (NUMBER OF GROUPS PASSING THROUGH OUTPUT PORT OF SAME SW: 2) | EXCLUDED | EXCLUDED |
| | | B→SW3→SW4→SW5→SW6→SW7→SW8→S2 (7 HOPS) | EXCLUDED | EXCLUDED | EXCLUDED | EXCLUDED | EXCLUDED | EXCLUDED |

FIG. 10

ROUTE CONTROL METHOD AND ROUTE CONTROL DEVICE

CROSS-REFERENCE TO RELATED APPLICATIONS

This application is a 371 U.S. National Phase of International Application No. PCT/JP2019/046627 filed on Nov. 28, 2019, which claims priority to Japanese Application No. 2018-227573 filed on Dec. 4, 2018. The entire disclosures of the above applications are incorporated herein by reference.

TECHNICAL FIELD

The present disclosure relates to a path control method and a path control device.

BACKGROUND ART

A cellular system can have a configuration in which a configuration of a base station is disposed to be separated into a wireless control device and a wireless device. In this case, the wireless control device and the wireless device are connected to each other through an optical section including an optical device and an optical fiber. The optical section including the optical device and the optical fiber is referred to as a mobile fronthaul (MFH).

In the related art, a point-to-point connection has been used in an MFH, but networking has also been examined in order to achieve a reduction in the cost of an MFH. Examples of networking include wavelength division multiplexing (WDM), a time division multiplexing-passive optical network (TDM-PON) using time division multiplexing, and a configuration in which layer-2 switches (L2SW) are cascade-connected. In particular, a network system in which layer-2 switches which are signal transfer devices are cascade-connected (hereinafter referred to as an "L2NW") has a ring or mesh type configuration, and thus the network system is considered to have higher reliability than other network systems.

On the other hand, a low delay is required in a mobile fronthaul. Consequently, standardization of a time sensitive network (TSN) has proceeded for the purpose of accommodating traffic having strict delay requirements. A time aware shaper (TAS), which is being examined for use in a TSN, is a particularly effective method in a case where high priority traffic has periodicity, and involves performing scheduling on traffic for each priority and switching communication availability.

Specifically, an operation of transferring only high priority traffic and not transferring low priority traffic in a period in which high priority traffic arrives at an SW and transferring low priority traffic in a period in which high priority traffic does not come is repeated periodically. Thereby, high priority traffic can be transferred without waiting for the transfer of traffic having other priorities, which is suitable for reducing delay.

FIG. 12 illustrates an example in which one wireless device A and one wireless control device S1 are accommodated in L2NW. L2-SW(1) to L2-SW(11) are layer-2 switches each functioning as a signal transfer device. Hereinafter, L2-SW(1) to L2-SW(11) may be abbreviated as SW(1) to SW(11), SW1 to SW11, simply SW, or the like. In addition, wireless devices A and B, the wireless control devices S1 and S2, and the like may be abbreviated simply as A, B, S1, S2, and the like.

Here, which path traffic between the wireless device and the wireless control devices passes through can be set on a user side. As a path selection procedure of the related art, there is a technique for selecting a path having a minimum number of hops (for example, see Non Patent Literature 1).

FIG. 13 illustrates a path selection procedure of the related art. As illustrated in FIG. 13, in a path selection procedure of the related art, in step 1 (S1), searching for an available communication path for each combination of a wireless device and a wireless control device is performed, and all available communication paths are listed.

In step 2 (S2), a communication path that does not satisfy preset setting conditions (request conditions of a network) is excluded from among the listed communication paths, and a communication path satisfying the setting conditions is extracted. The setting conditions include one or more of items such as an allowable number of hops, an allowable delay time, an allowable transmission distance, and the like.

In step 3 (S3), a communication path having a minimum number of hops is selected for each combination of a wireless device and a wireless control device from among the extracted communication paths, and the processing is terminated. Here, in a case where there are a plurality of communication paths having a minimum number of hops, any one of the communication paths is selected randomly, and the processing is terminated.

FIG. 14 illustrates an example of a case where a communication path is selected according to the related art illustrated in FIG. 13. Here, a communication path having a minimum number of hops is selected from among a plurality of communication paths.

FIG. 15 illustrates a flow of traffic in the example illustrated in FIG. 14. A TAS is applied, and thus a period in which high priority traffic can be transmitted (high priority signal transmittable period: HP) and a period in which low priority traffic can be transmitted (low priority signal transmittable period: LP) are repeated in each SW.

FIG. 16 illustrates an example in which two wireless devices A and B and two wireless control devices S1 and S2 are accommodated in L2NW. The wireless device A belongs to the wireless control device S1. The wireless device B belongs to the wireless control device S2.

FIG. 17 illustrates the selection of a communication path in which a path selection procedure of the related art is applied to the example illustrated in FIG. 16. A path between the wireless device A and the wireless control device S1 has a minimum number of hops. In addition, a path between the wireless device B and the wireless control device S2 also has the minimum number of hops.

FIG. 18 illustrates a flow of traffic in the example illustrated in FIG. 17. L2-SW(2) is required to flow traffic of two communications. For this reason, as compared to L2-SW(1) or L2-SW(3) that allows the flow of traffic of one communication, it is necessary to extend a high priority signal transmittable period (HP) for L2-SW(2) and the following L2SWs.

CITATION LIST

Non Patent Literature

Non Patent Literature 1: Atsufumi Moriyama and three others, "A Proposal of Routing Algorithm Dealing with Multiple Metrics and A Study on the Precondition", [online] Aug. 16, 2010, IEICE, Temporary Technical Committee on Next Generation Networks, Workshop 2010; [accessed Nov. 13, 2018], Internet (URL: http://www.ieice.org/~nwgn/file_ws10/10_Moriyama.pdf)

SUMMARY OF THE INVENTION

Technical Problem

When a communication path is changed after a communication path between a wireless device and a wireless control device is once determined and communication is started, communication is temporarily interrupted, which leads to service interruption. For this reason, it is desirable not to change the communication path after a communication path between the wireless device and the wireless control device is determined and communication is started. For example, as illustrated in FIG. 18, when a high priority signal transmittable period is extended through the existing communication between a wireless device and a wireless control device, the number of communications between the wireless device and the wireless control device which can be newly added for a high priority signal transmittable period decreases. Further, when the high priority signal transmittable period is extended, a low priority signal transmittable period is shortened, and thus the number of communications that can be added decreases at the time of attempting to newly increase low priority signal communication. Further, the extension of the high priority signal transmittable period results in an increase in a delay time of high priority traffic flowing in the high priority signal transmittable period. In addition, regarding low priority traffic, a low priority signal transmittable period becomes shorter, which results in an increase in a waiting time and an increase in a delay time.

That is, in the related art, a plurality of communication paths pass through the same output port of signal transfer devices, and thus there is a problem in which the number of communications between a wireless device and a wireless control device which is acceptable in one network decreases, and a delay time of high priority traffic or low priority traffic is also extended.

An object of the present disclosure is to provide a path control method and a path control device which are capable of increasing the number of communications which is acceptable in a network.

Means for Solving the Problem

According to an aspect of the present disclosure, a path control method of controlling a communication path in a network including a plurality of wireless devices communicating with a terminal in a wireless manner and a plurality of wireless control devices communicating with any one of the plurality of wireless devices through a plurality of signal transfer devices includes searching for available communication paths and listing the available communication paths for individual combinations of a wireless device of the plurality of wireless devices and a wireless control device of the plurality of wireless control devices, and selecting a combination of communication paths in which a maximum value of the number of communications passing through the same output port of a signal transfer device of the plurality of signal transfer devices is minimized from among the listed available communication paths.

In addition, according to the aspect of the present disclosure, the path control method further includes determining whether or not the maximum value of the number of communications passing through the same output port of a signal transfer device of the plurality of signal transfer devices is 1 in a case where a plurality of combinations of communication paths is selected from among the listed available communication paths, grouping the available communication paths between each wireless device belonging to a common wireless control device and the common wireless control device, for each wireless control device in a case where it is determined that the maximum value of the number of communications passing through the same output port of a signal transfer device of the plurality of signal transfer devices is not 1, and selecting a combination of the communication paths in which a maximum value of the number of groups of the available communication paths passing through the same output port of a signal transfer device of the plurality of signal transfer devices is minimized.

Further, in the path control method according to the aspect of the present disclosure, each signal transfer device periodically switches between a high priority signal transmittable period in which a high priority signal is transmittable and a low priority signal transmittable period in which a low priority signal is transmittable.

According to another aspect of the present disclosure, a path control method of controlling a communication path in a network including a plurality of signal transfer devices periodically switching between a high priority signal transmittable period in which a high priority signal is transmittable and a low priority signal transmittable period in which a low priority signal is transmittable, a plurality of wireless devices communicating with a terminal in a wireless manner, and a plurality of wireless control devices communicating with any one of the plurality of wireless devices through the signal transfer devices includes searching for available communication paths and listing the available communication paths for individual combinations of a wireless device of the plurality of wireless devices and a wireless control device of the plurality of wireless control devices, and selecting a combination of communication paths in which a maximum value of the high priority signal transmittable period in communication passing through the same output port of a signal transfer device of the plurality of signal transfer devices is minimized, from among the listed available communication paths.

Further, in the path control method according to the aspect of the present disclosure, in searching and listing available communication paths, searching for and listing available communication paths for only combinations of a wireless device of the plurality of wireless devices and a wireless control device of the plurality of wireless control devices for which a communication path is not determined.

In addition, according to still another aspect of the present disclosure, a path control device for controlling a communication path in a network including a plurality of wireless devices communicating with a terminal in a wireless manner and a plurality of wireless control devices communicating with any one of the plurality of wireless devices through a plurality of signal transfer devices includes a searching and listing unit configured to search for available communication paths and list the available communication paths for individual combinations of a wireless device of the plurality of wireless devices and a wireless control device of the plurality of wireless control devices, and a communication path selection unit configured to select a combination of communication paths in which a maximum value of the number of communications passing through the same output port of a signal transfer device of the plurality of signal transfer devices is minimized from among the available communication paths listed by the searching and listing unit.

Further, the path control device according to the aspect of the present disclosure further includes a determination unit configured to determine whether or not the maximum value of the number of communications passing through the same output port of a signal transfer device of the plurality of signal transfer devices is 1 in a case where the communication path selection unit selects a plurality of combinations of the communication paths, a grouping unit configured to group the available communication paths between each wireless device belonging to a common wireless control device and the common wireless control device, for each wireless control device, in a case where the determination unit determines that the maximum value of the number of communications passing through the same output port of a signal transfer device of the plurality of signal transfer devices is not 1, and a group path selection unit configured to select a combination of the communication paths in which a maximum value of the number of groups of the available communication paths passing through the same output port of a signal transfer device of the plurality of signal transfer devices is minimized.

Further, in the path control device according to the aspect of the present disclosure, each signal transfer device periodically switches between a high priority signal transmittable period in which a high priority signal is transmittable and a low priority signal transmittable period in which a low priority signal is transmittable.

In addition, according to still another aspect of the present disclosure, a path control device for controlling a communication path in a network including a plurality of signal transfer devices periodically switching between a high priority signal transmittable period in which a high priority signal is transmittable and a low priority signal transmittable period in which a low priority signal is transmittable, a plurality of wireless devices communicating with a terminal in a wireless manner, and a plurality of wireless control devices communicating with any one of the plurality of wireless devices through some of the plurality of signal transfer devices includes a searching and listing unit configured to search for available communication paths and list the available communication paths for individual combinations of a wireless device of the plurality of wireless devices and a wireless control device of the plurality of wireless control devices, and a communication path selection unit configured to select a combination of communication paths in which a maximum value of the high priority signal transmittable period in communication passing through the same output port of a signal transfer device of the signal transfer devices is minimized, from among available communication paths listed by the searching and listing unit.

In addition, in the path control device according to the aspect of the present disclosure, the searching and listing unit searches for and lists available communication paths for only combinations of a wireless devices of the plurality of wireless devices and a wireless control device of the plurality of wireless control devices for which a communication path is not determined.

Effects of the Invention

The present disclosure can increase the number of communications between a wireless device and a wireless control device which is acceptable in a network.

BRIEF DESCRIPTION OF DRAWINGS

FIG. 4(a) is a diagram illustrating a process of selecting a communication path in the related art.

FIG. 4(b) is a diagram illustrating a process of selecting a communication path in a path control device.

FIG. 10 is a diagram illustrating a process of selecting a communication path in the path control device.

DESCRIPTION OF EMBODIMENTS

Figure 1:
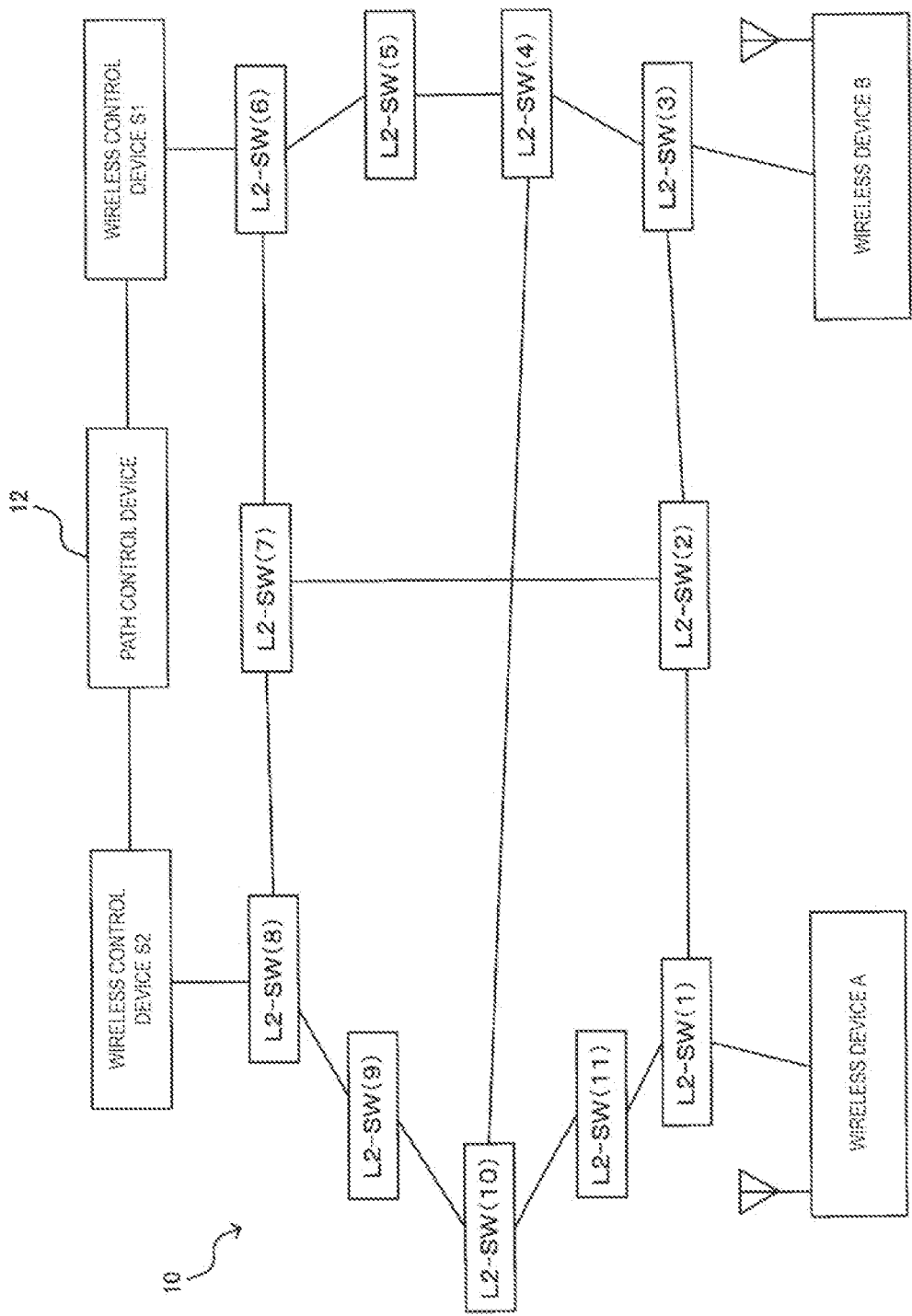
FIG. 1 is a diagram illustrating a configuration example of a wireless communication network including a path control device according to an embodiment.

Hereinafter, an embodiment of a path control device will be described using the drawings. FIG. 1 illustrates a configuration example of a wireless communication network 10 including a path control device according to an embodiment. As illustrated in FIG. 1, the wireless communication network 10 is, for example, a network system (L2NW) including wireless devices A and B, wireless control devices S1 and S2, and a path control device 12 which are connected to each other through L2-SW(1) to L2-SW(11) which are cascade-connected.

The wireless devices A and B respectively communicate with a terminal in a wireless manner. The wireless control devices S1 and S2 communicate with any one of the wireless devices A and B through L2-SW(1) to L2-SW(11). Here, the wireless device A belongs to the wireless control device S1. The wireless device B belongs to the wireless control device S2. L2-SW(1) to L2-SW(11) are layer-2 switches each functioning as a signal transfer device. For example, L2-SW(1) to L2-SW(11) periodically switch between a high priority signal transmittable period in which a high priority signal can be transmitted and a low priority signal transmittable period in which a low priority signal can be transmitted.

The path control device 12 controls a communication path in the wireless communication network 10. The path control device 12 may be disposed anywhere on the wireless communication network 10 as long as it can be connected to L2-SW(1) to L2-SW(11) each functioning as a signal transfer device in order to set a path for L2-SW(1) to L2-SW(11).

Figure 2:
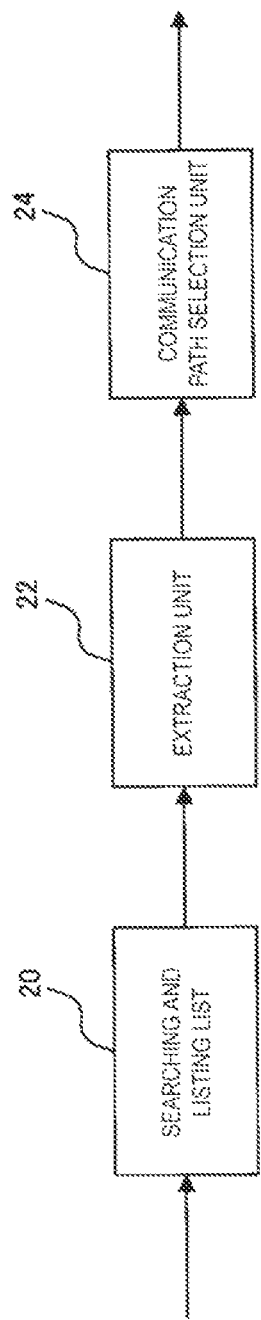
FIG. 2 is a diagram illustrating functions of the path control device.

FIG. 2 illustrates functions of the path control device 12. As illustrated in FIG. 2, the path control device 12 includes a searching and listing unit 20, an extraction unit 22, and a communication path selection unit 24.

The searching and listing unit 20 searches for and lists available communication paths for each combination of a wireless device and a wireless control device. In addition, the searching and listing unit 20 may search for and list available communication paths for only a combination of a wireless device and a wireless control device for which a communication path is not determined. For example, in a case where a wireless device or a wireless control device are newly added to a network in which a communication path has already been set, the searching and listing unit 20 may search for and list available communication paths for only the combination of the newly added wireless device and wireless control device.

The extraction unit 22 excludes a communication path that does not satisfy preset setting conditions (request conditions of a network) from the communication paths listed by the searching and listing unit 20, and extracts a communication path satisfying the setting conditions. The setting conditions include one or more of items such as an allowable number of hops, an allowable delay time, an allowable transmission distance, and the like.

The communication path selection unit 24 counts the number of communications passing through the same output port of L2-SW(1) to L2-SW(11) for each combination of communication paths from a plurality of communication paths extracted by the extraction unit 22, and selects a combination of communication paths in which a maximum value of the number of communications is minimized.

In addition, the communication path selection unit 24 may select a combination of communication paths in which a maximum value of a high priority signal transmittable period is minimized in communication passing through the same output port of L2-SW(1) to L2-SW(11) from among the plurality of communication paths listed by the searching and listing unit 20. For example, in a case where the length of a high priority signal transmittable period is different for each combination of a wireless device and a wireless control device, the communication path selection unit 24 may select a combination in which a maximum value of a high priority signal transmittable period at a location passing through the same output port of the same SW is minimized.

Note that the functions of the path control device 12 may be mounted at any one of the units constituting the wireless communication network 10 or may be mounted to be distributed among the units constituting the wireless communication network 10. For example, the functions of the path control device 12 may be mounted in any one of the wireless control devices S1 and S2 or may be realized by a plurality of components.

Next, an example of a method in which the path control device 12 selects a communication path will be described.

Figure 3:
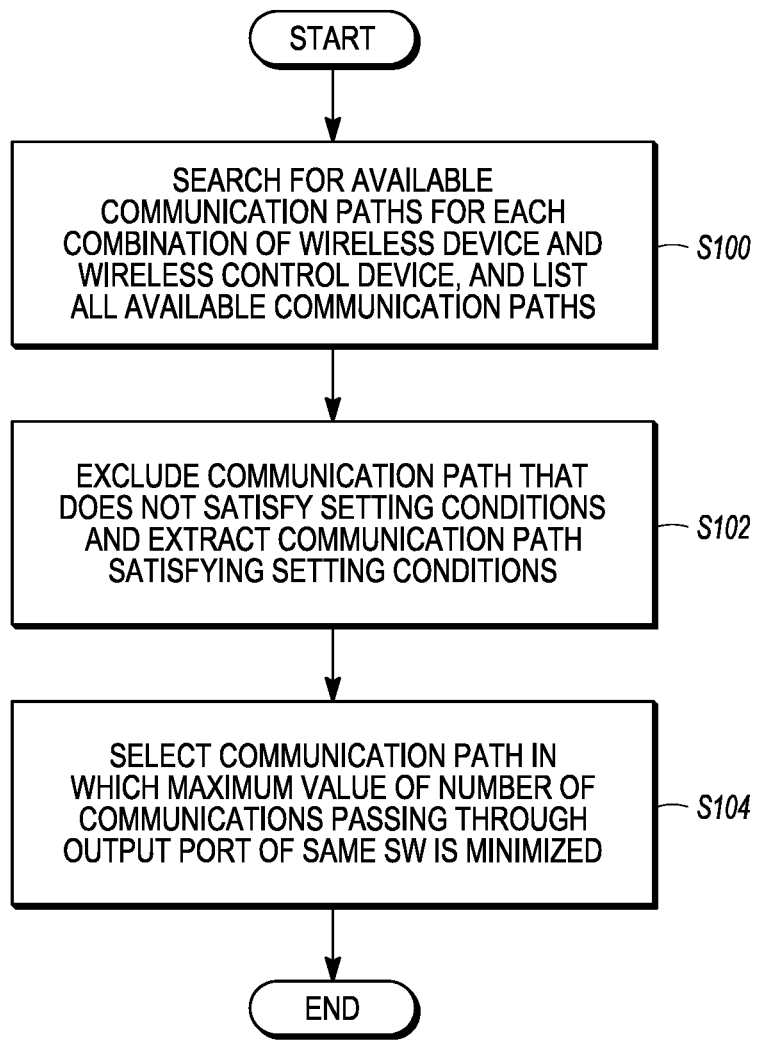
FIG. 3 is a flowchart illustrating an example of a method in which the path control device selects a communication path.

FIG. 3 illustrates an example of a method in which the path control device 12 selects a communication path. As illustrated in FIG. 3, in the path control device 12, in step 100 (S100), the searching and listing unit 20 searches for available communication paths for each combination of a wireless device and a wireless control device and lists all available the communication paths.

In step 102 (S102), the extraction unit 22 excludes a communication path that does not satisfy preset setting conditions among the communication paths listed by the searching and listing unit 20, and extracts a communication path satisfying the setting conditions.

In step 104 (S104), the communication path selection unit 24 selects a communication path in which a maximum value of the number of communications passing through the same output port of an SW is minimized from among the communication paths extracted by the extraction unit 22.

For example, in a case where there are a first communication path and a second communication path, the number of communications passing through the same output port of an SW is set to 1 when the first communication path never passes through the same output port of an SW within the second communication path. Further, in a case where the first communication path and the second communication path pass through the same output port of the same SW in the middle of the respective communication paths and then pass through the same path, a maximum value of the number of communications passing through the same output port of the SW is set to 2. Further, in a case where the first communication path and the second communication path pass through the same output port of the same SW once in the middle of the respective paths, take different paths and then pass through the same output port of the same SW again through, a maximum value of the number of communications passing through the same output port of the SW is set to 2.

In this case, for example, when there are a plurality of communication paths in which a maximum value of the number of communications passing through the same output port of the SW is minimized, the communication path selection unit 24 may randomly select any one of the communication paths and terminate the processing.

Figure 13:
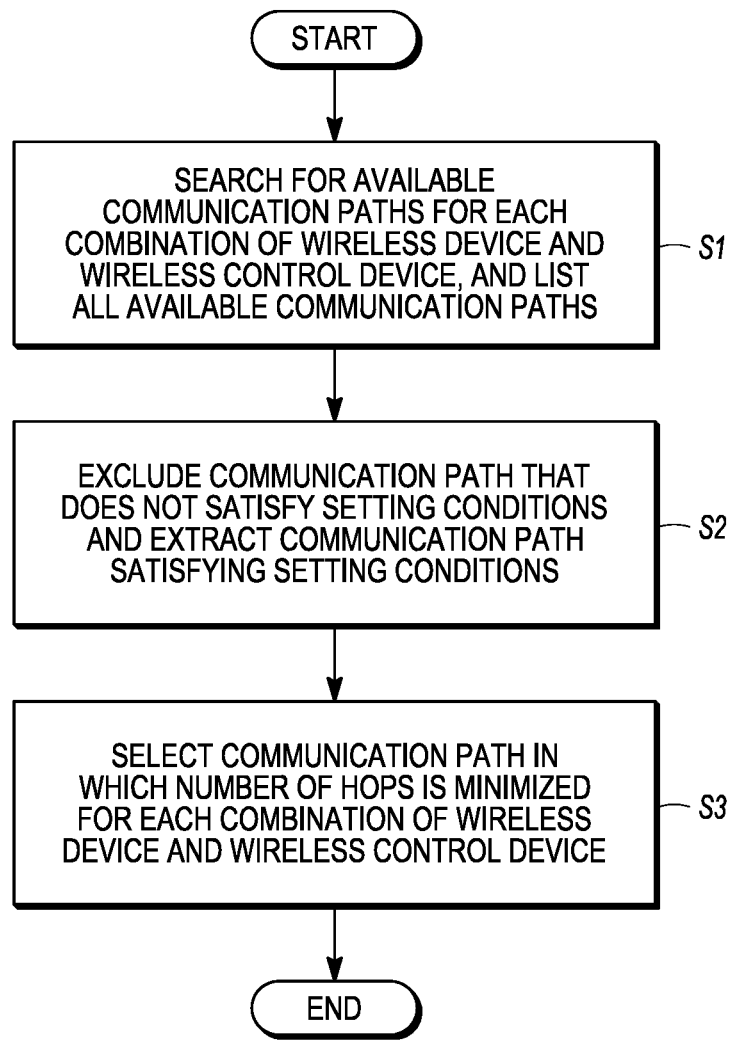
FIG. 13 is a flowchart illustrating a path selection procedure of the related art.
Figure 14:
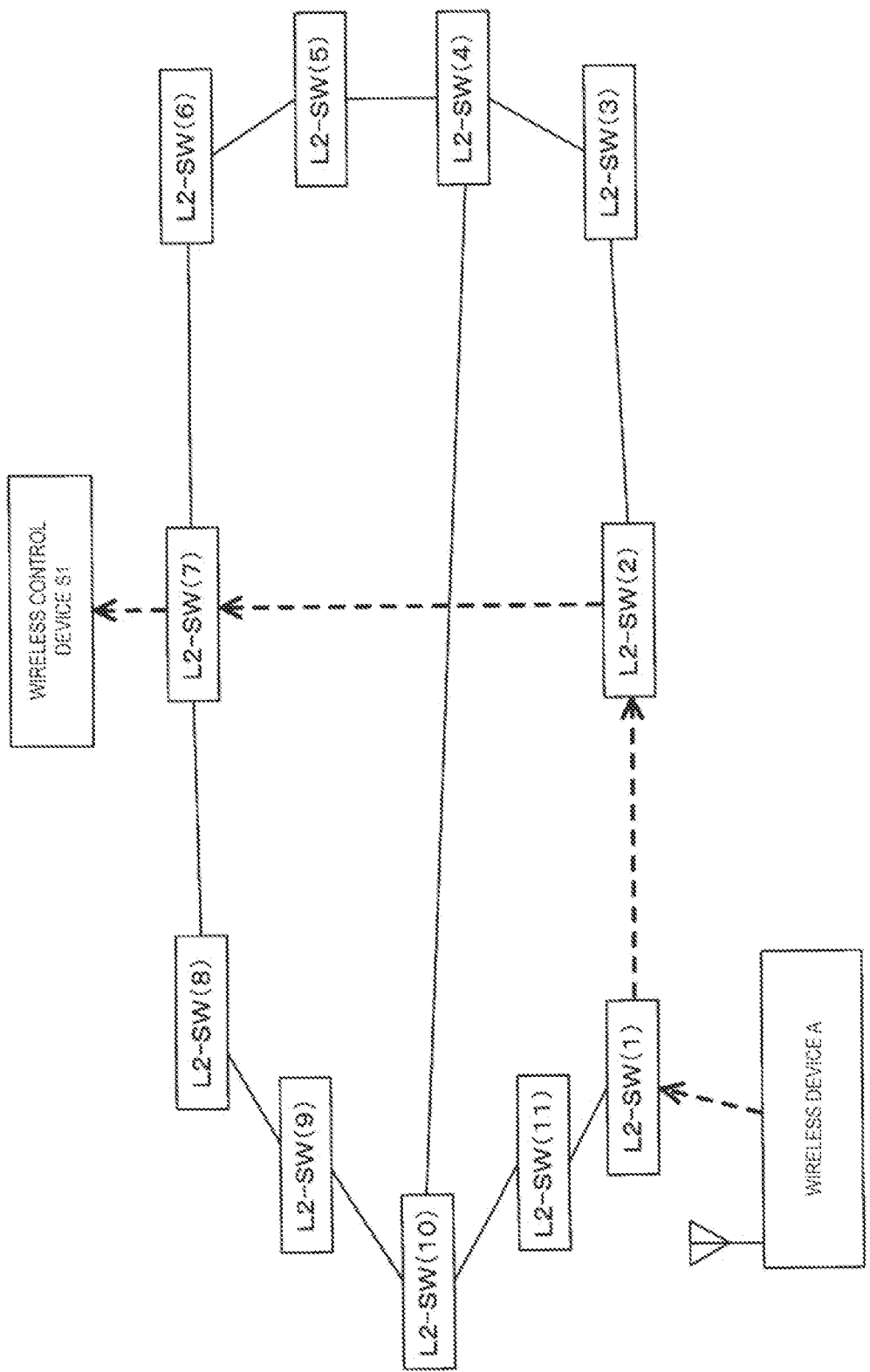
FIG. 14 is a diagram illustrating an example of a case where a communication path is selected according to the related art.
Figure 15:
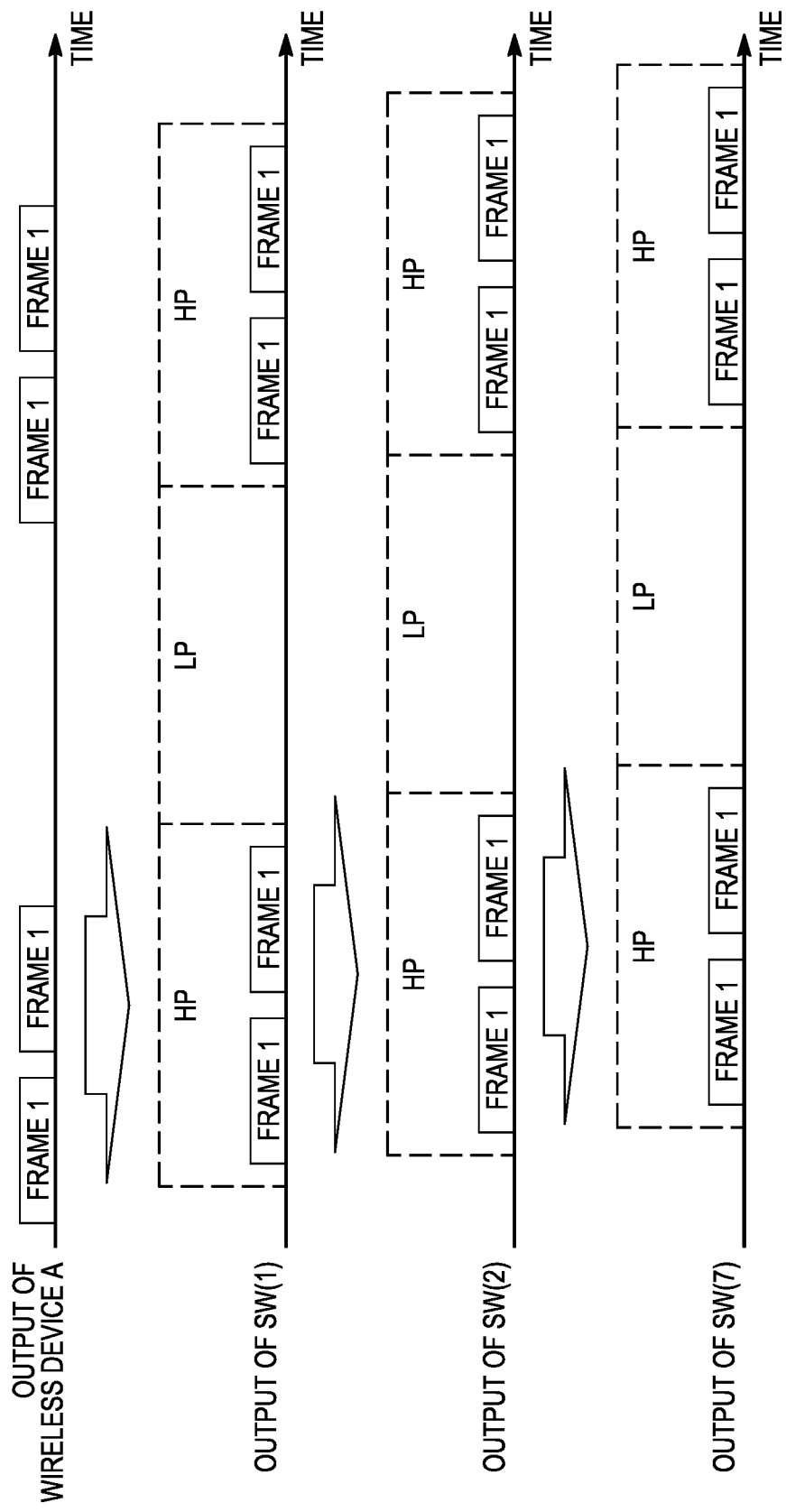
FIG. 15 is a diagram illustrating a flow of traffic in the example illustrated in FIG. 14.
Figure 16:
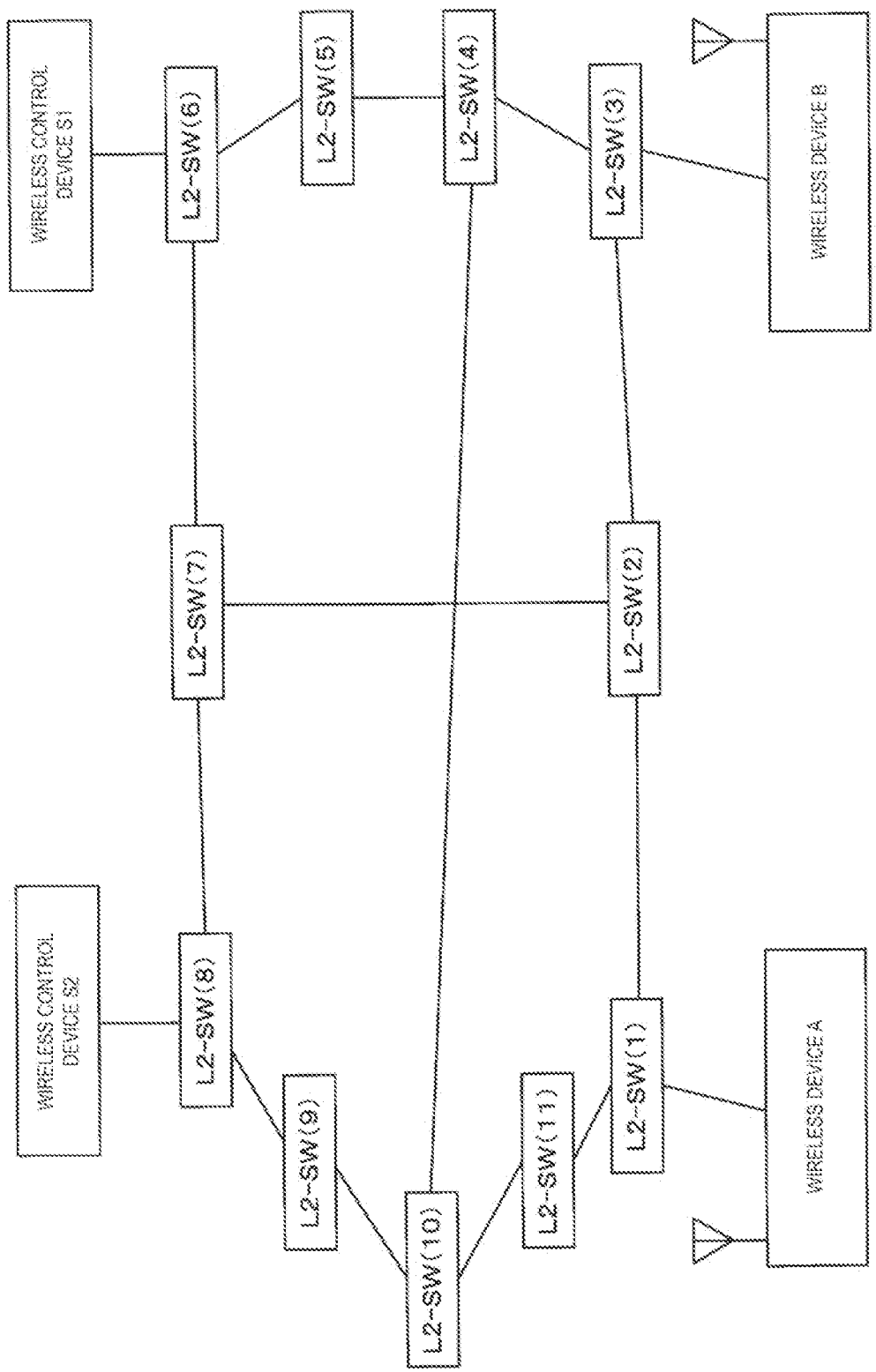
FIG. 16 is a diagram illustrating an example in which two wireless devices A and B and two wireless control devices S1 and S2 are accommodated in L2NW.

FIG. 4 illustrates comparison of a process of selecting a communication path between a method of the related art and the path control device 12. FIG. 4(a) illustrates a process of selecting a communication path in the related art. FIG. 4(b) illustrates a process of selecting a communication path in the path control device 12. In other words, FIG. 4 illustrates differences of combinations of selectable communication paths in the wireless communication network 10 between the related art (see FIG. 13) and the path control device 12 (see FIG. 3). Here, a communication path in which the number of hops is 8 or greater is not described.

For example, in both the related art and the path control device 12, first, an available communication path for each combination of a wireless device and a wireless control device is searched for, and all available the communication paths are listed. In this example, it is assumed that three communication paths are available between the wireless device A and the wireless control device S1 and three communication paths are available between the wireless device B and the wireless control device S2 with 7 or fewer hops.

Additionally, in both the related art and the path control device 12, secondly, a communication path that does not satisfy preset setting conditions is excluded from the listed communication paths, and a communication path satisfying the setting conditions is extracted. In this example, it is assumed that an upper limit of the number of hops is 6, and a communication path in which the number of hops is 7 or greater is excluded ("Excluded" in FIG. 4 indicates the corresponding location).

Figure 17:
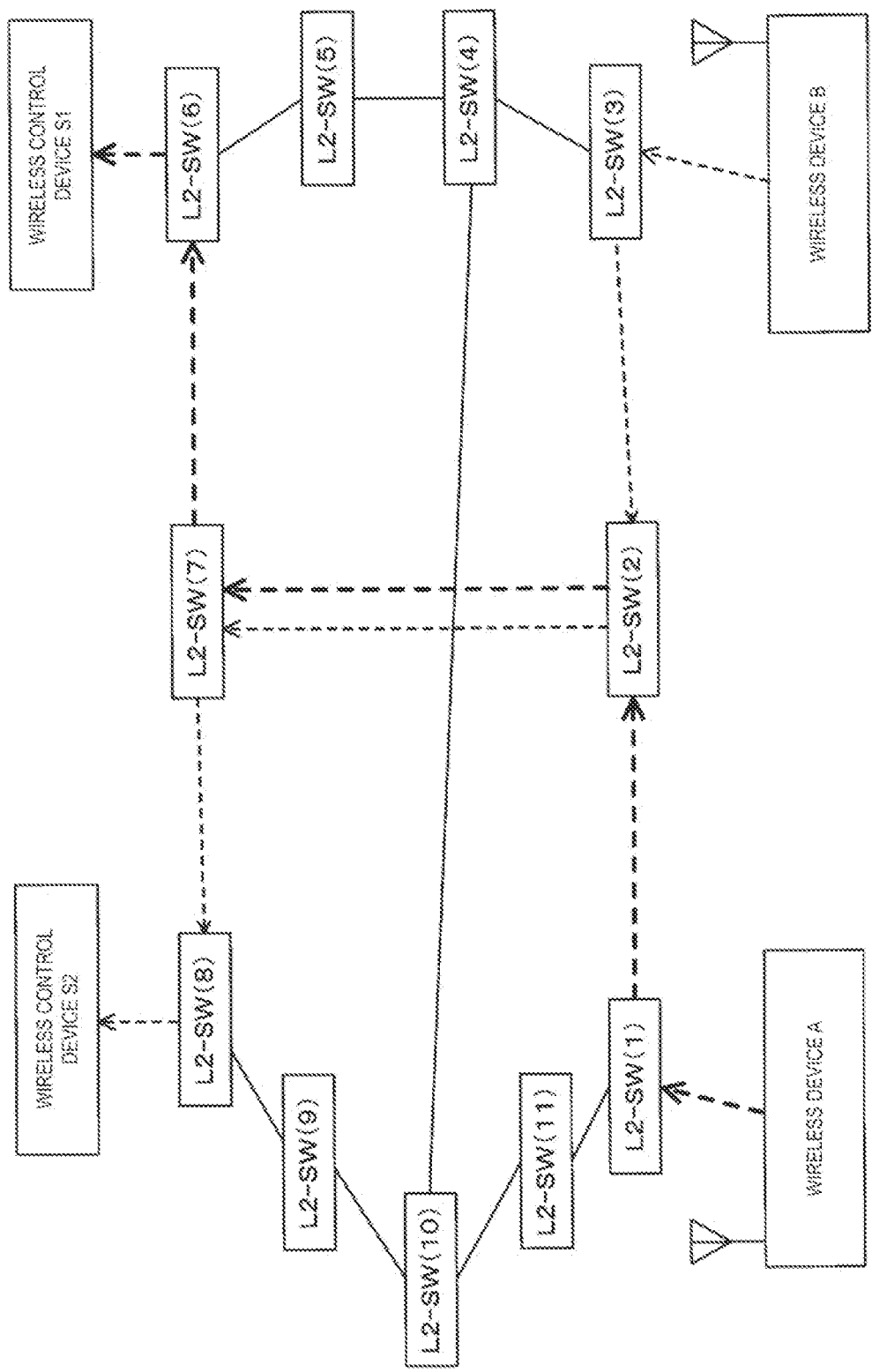
FIG. 17 is a diagram illustrating the selection of a communication path to which a path selection procedure of the related art is applied.
Figure 18:
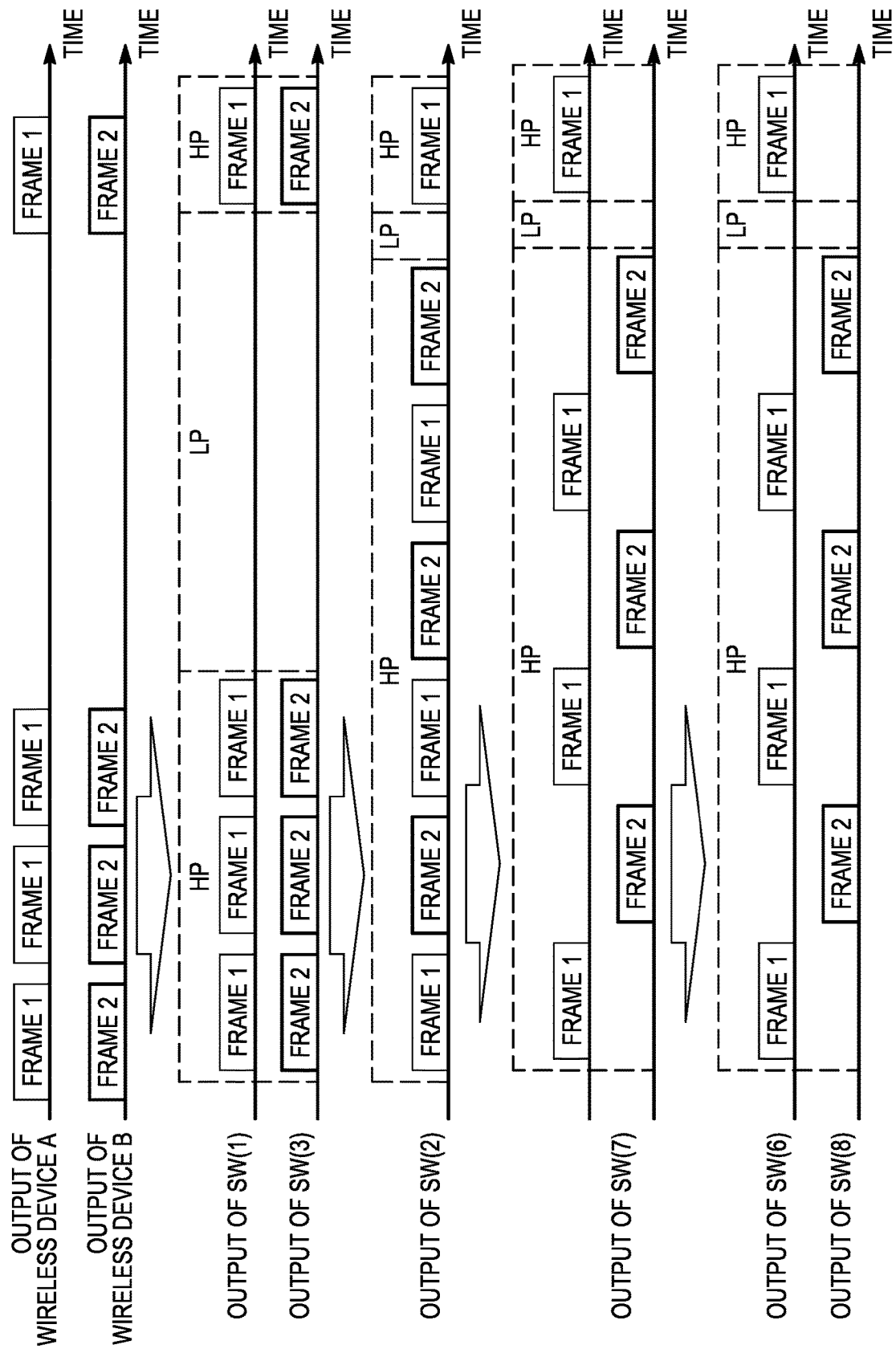
FIG. 18 is a diagram illustrating a flow of traffic in the example illustrated in FIG. 17.

In the case of the related art, all of the combinations of the remaining communication paths except for the communication paths in which the number of hops is 7 or greater serve as objects to be selected, but thirdly, a communication path having a minimum number of hops is selected. Thus, in the related art, a communication path of A→SW1→SW2→SW7→SW6→S1 is selected between the wireless device A and the wireless control device S1, a communication path of B→SW3→SW2→SW7→SW8→S2 is selected between the wireless device B and the wireless control device S2, and the communication paths pass through the same output port of the same SW (see FIG. 17).

On the other hand, thirdly, the path control device 12 calculates a maximum value of the number of communications passing through the same output port of the same SW and selects a combination in which the calculated value is smallest. For this reason, in the path control device 12, a communication path of A→SW1→SW2→SW7→SW6→S1 is selected between the wireless device A and the wireless control device S1, and a communication path of B→SW3→SW4→SW10→SW9→SW8→S2 is selected between the wireless device B and the wireless control device S2.

Figure 5:
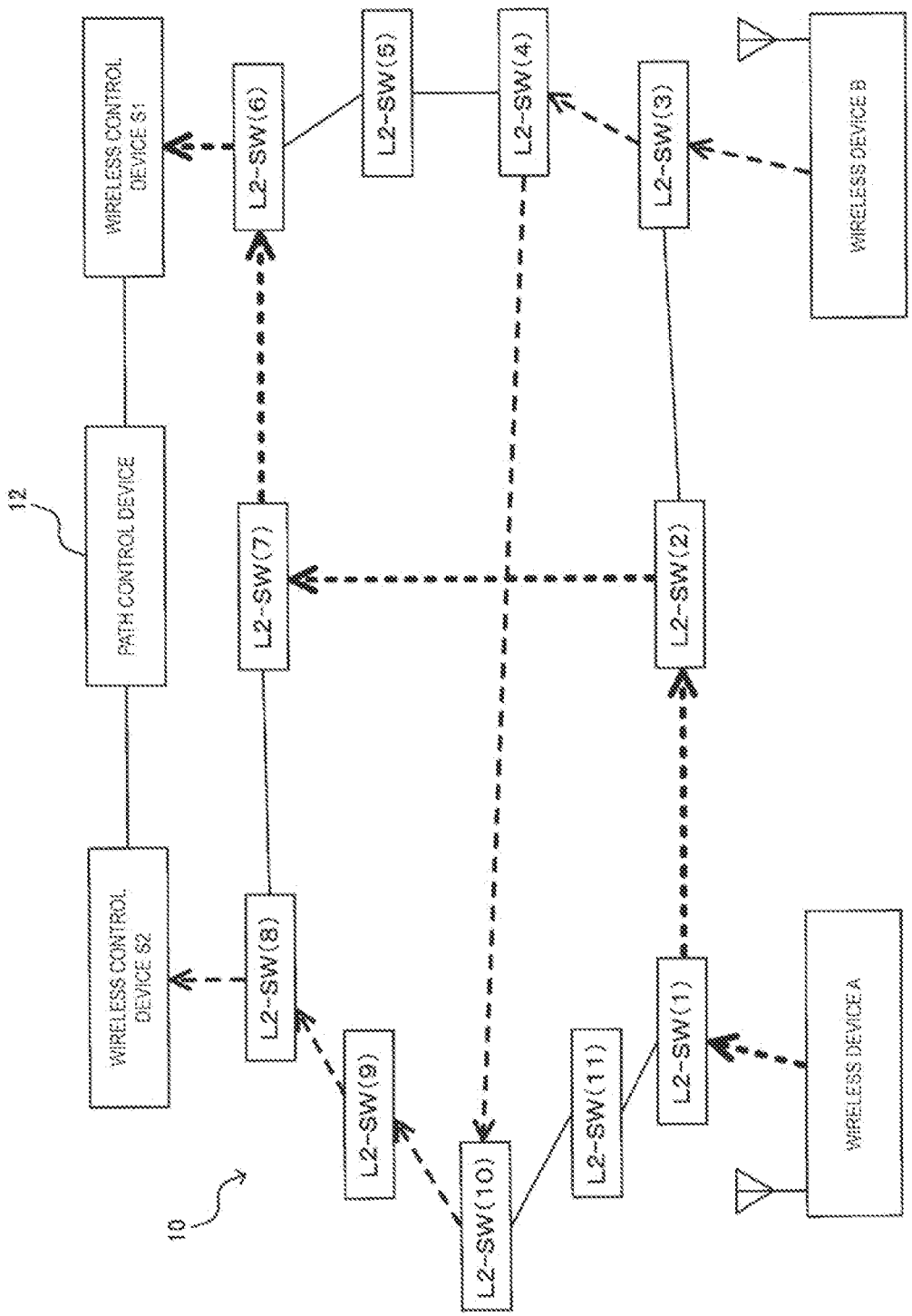
FIG. 5 is a diagram illustrating an example in which the path control device selects a communication path in a wireless communication network.

FIG. 5 illustrates an example in which the path control device 12 selects a communication path in the wireless communication network 10. As illustrated in FIG. 5, a communication path between the wireless device A and the wireless control device S1 and a communication path between the wireless device B and the wireless control device S2 which are selected by the path control device 12 do not pass through the same output port of the same SW.

Figure 6:
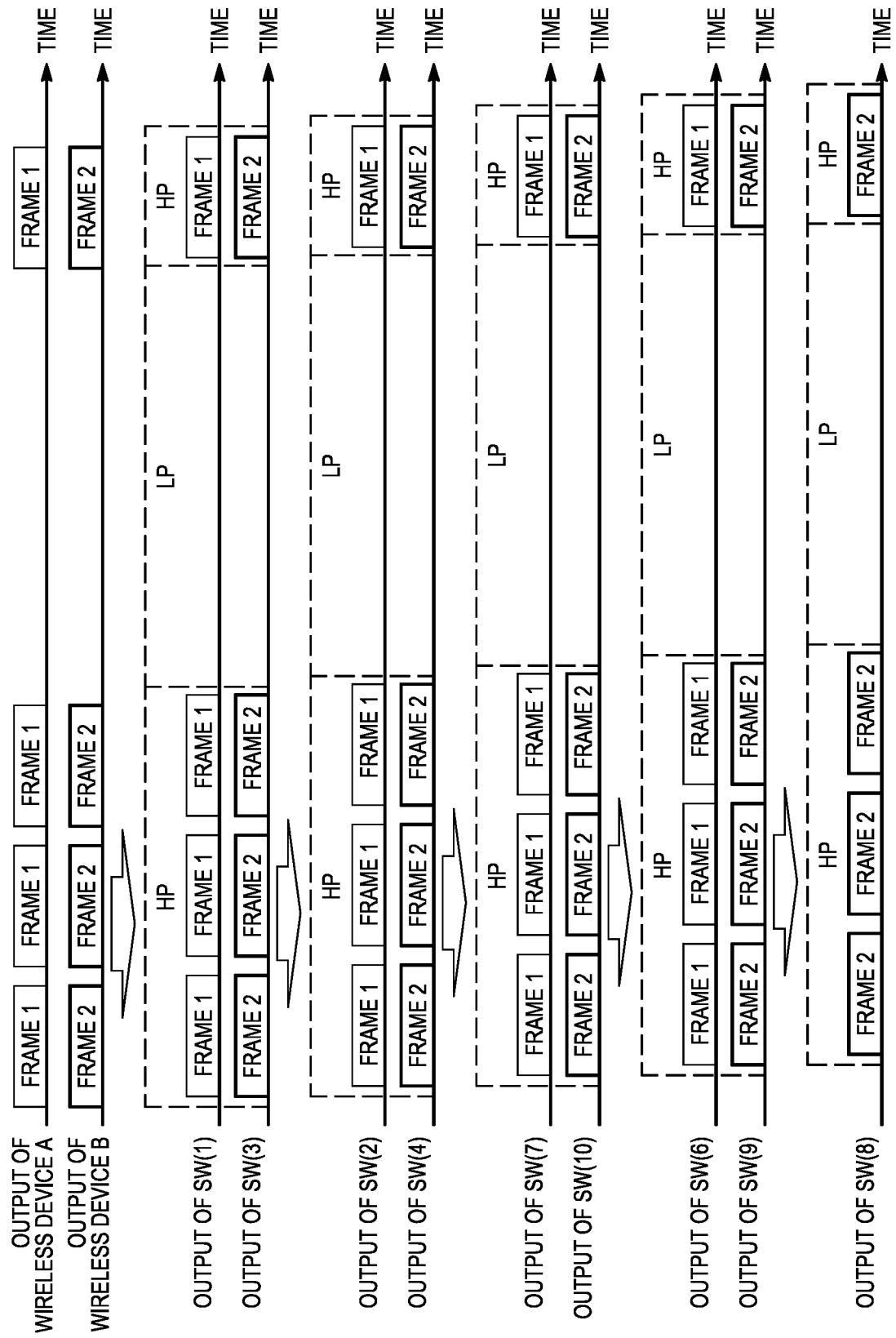
FIG. 6 is a diagram illustrating a flow of traffic in the communication path illustrated in FIG. 5.

FIG. 6 illustrates a flow of traffic in the communication path illustrated in FIG. 5. Since a communication path between the wireless device A and the wireless control device S1 and a communication path between the wireless device B and the wireless control device S2 do not pass through the same output port of the same SW, a high priority signal transmittable period (HP) is not extended, and a low priority signal transmittable period is not shortened accordingly.

In a case where there are a plurality of combinations of paths in which a maximum value of the number of communications passing through the same output port of the same SW is minimized, the path control device 12 selects any one of the combinations as a communication path. As selection criteria in this case, the combination may be selected such that, for example, the sum of hops of the selected combination of paths is minimized. In addition, combinations of wireless devices and wireless control devices are prioritized, and selection criteria may be determined such that a combination having a smaller number of hops is selected from among high priority combinations of wireless devices and wireless control devices.

In order to set a path for L2-SW(1) to L2-SW(11) that function as signal transfer devices in the wireless communication network 10, the path control device 12 is configured to be capable of being connected to L2-SW(1) to L2-SW(11). Then, the path control device 12 determines a communication path in accordance with the above-described procedure and performs setting on each of L2-SW(1) to L2-SW(11) so that signals are transmitted through the determined communication path. In addition, an operator may perform setting on each of L2-SW(1) to L2-SW(11) at the actual location so that traffic flows to the path determined in accordance with the above-described procedure.

In this manner, selecting a combination of communication paths in which a maximum value of the number of communications passing through the same output port of the signal transfer device is minimized enables to avoid extending a high priority signal transmittable period. Thereby, the number of wireless devices and wireless control devices that can be newly added and delay times of high priority traffic and low priority traffic are also reduced.

Next, other embodiments of the path control device will be described.

Figure 7:
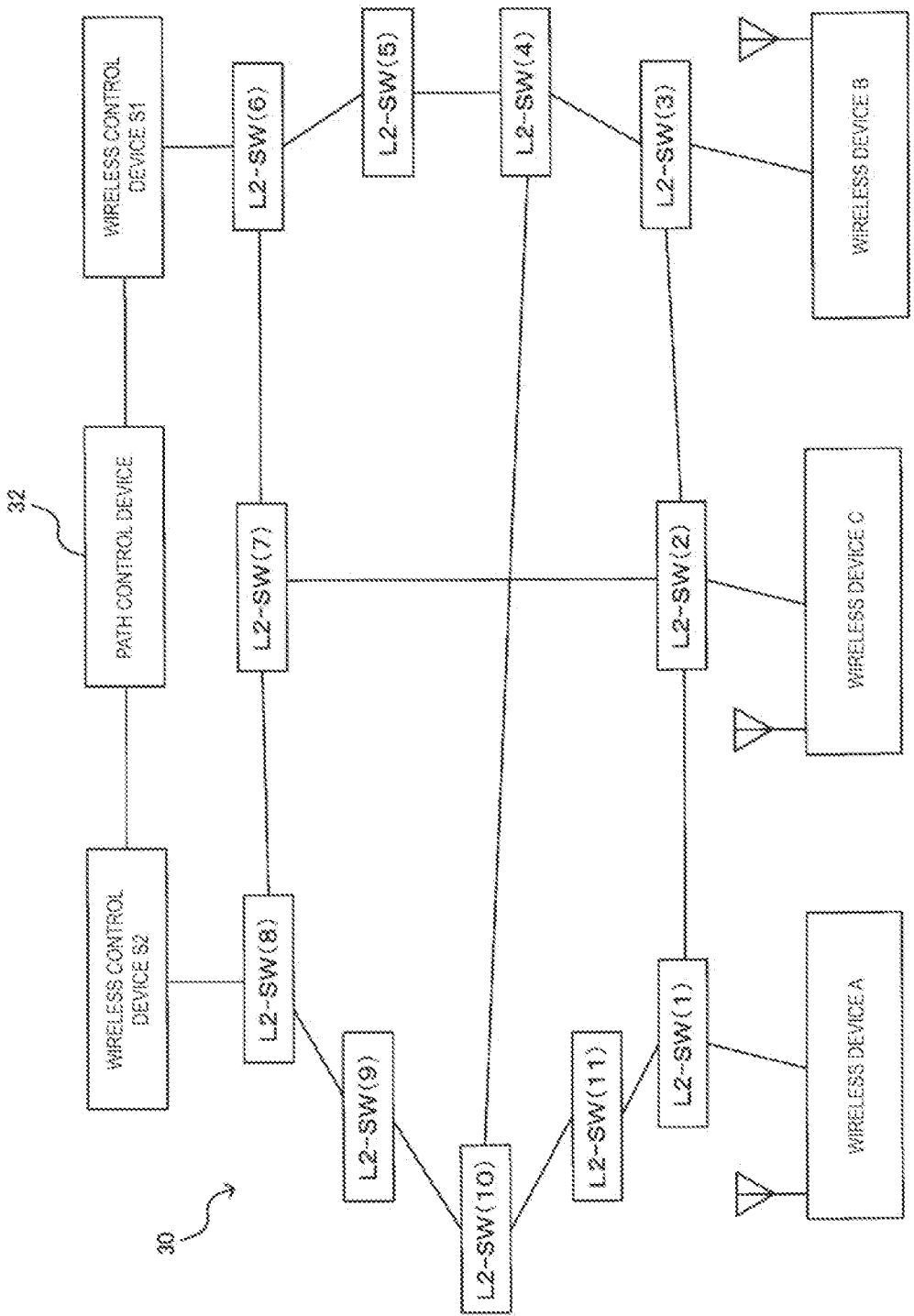
FIG. 7 is a diagram illustrating a configuration example of a wireless communication network including a path control device according to another embodiment.

FIG. 7 illustrates a configuration example of a wireless communication network 30 including a path control device according to another embodiment. As illustrated in FIG. 7, the wireless communication network 30 is, for example, a network system (L2NW) including wireless devices A, B, and C, wireless control devices S1 and S2, and a path control device 32 which are connected to each other through L2-SW (1) to L2-SW(11) which are cascade-connected. Hereinafter, components that are substantially the same as those described using FIGS. 1 to 3 and the like will be denoted by the same reference numerals and signs.

In the wireless communication network 30, the wireless devices A and C belong to the wireless control device S1. The wireless device B belongs to the wireless control device S2. In this case, the wireless control device is commonly used in communication between the wireless device A and the wireless control device S1 and communication between the wireless device C and the wireless control device S1, and thus an uplink signal necessarily passes through the same output port of a signal transfer device (L2-SW(6)) which is the last L2-SW before the wireless control device S1. Thus, a maximum value of the number of communications passing through the same output port of the same SW is not 1 but is equal to or greater than 2.

Here, the number of communications overlapping in the output ports of the signal transfer devices other than the last signal transfer device before the wireless control device S1 is considered. In the path control device 12 illustrated in FIG. 1, in a case where there are a plurality of combinations of paths in which a maximum value of the number of communications overlapping in the output ports of the signal transfer devices other than the last signal transfer device before the wireless control device S1 is equal to or less than 2, a criterion regarding which one of the combinations is selected is not restricted.

In the wireless communication network 30 illustrated in FIG. 7, in a case where a maximum value of the number of communications overlapping in the output ports of the signal transfer devices other than the last signal transfer device before the wireless control device S1 is 2, the following three patterns are considered for a combination of the overlapping paths.

(a) Overlapping of a set of the wireless device A and the wireless control device S1 and a set of the wireless device C and the wireless control device S1.

(b) Overlapping of a set of the wireless device A and the wireless control device S1 and a set of the wireless device B and the wireless control device S2.

(c) Overlapping of a set of the wireless device C and the wireless control device S1 and a set of the wireless device B and the wireless control device S2.

Here, taking uplink communication as an example, communication between the wireless device A and the wireless device C necessarily passes through the same output port of the last signal transfer device before the wireless control device S1, and thus a high priority signal transmittable period is extended. For this reason, even when the overlapping of pattern (a) occurs in the output port of the signal transfer device other than the last signal transfer device before the wireless control device S1 and a high priority signal transmittable period is extended, the high priority signal transmittable period has the same length as the high priority signal transmittable period in the last signal transfer device before the wireless control device S1, and thus the number of wireless devices that can be accommodated in the wireless control device S1 does not change.

On the other hand, there is only an uplink signal from the wireless device B in communication passing through the output port of the last signal transfer device before the wireless control device S2, and thus it is only required that a high priority signal section corresponding to the amount of transmission of signals of the wireless device B is provided in the output port of the last signal transfer device before the wireless control device S2.

However, in a case where the overlapping of (b) or (c) occurs in the output port of the signal transfer device other than the last signal transfer device before the wireless control device S2, a high priority signal transmittable period is required to be extended. Thus, a high priority signal transmittable period is extended also in the last signal transfer device before the wireless control device S2, and the number of wireless devices that can be accommodated in the wireless control device S2 decreases.

That is, overlapping of communication paths of wireless devices belonging to the same wireless control device does not reduce the number of wireless devices that can be accommodated in the wireless control device, and overlapping of communication paths of wireless devices belonging to another wireless control device may reduce the number of wireless devices that can be accommodated in any one wireless control device.

Thus, in a case where a maximum value of the number of communications passing through the same output port of the same SW is not 1, the path control device 32 groups combinations of wireless devices and wireless control devices for which communication paths necessarily pass through the same output port of the same SW and minimizes the number of groups passing through the same output port of the same SW. Note that the path control device 32 may be disposed anywhere on the wireless communication network 30 as long as it can be connected to L2-SW(1) to L2-SW(11) functioning as signal transfer devices in order to set a path for L2-SW(1) to L2-SW(11).

Figure 8:
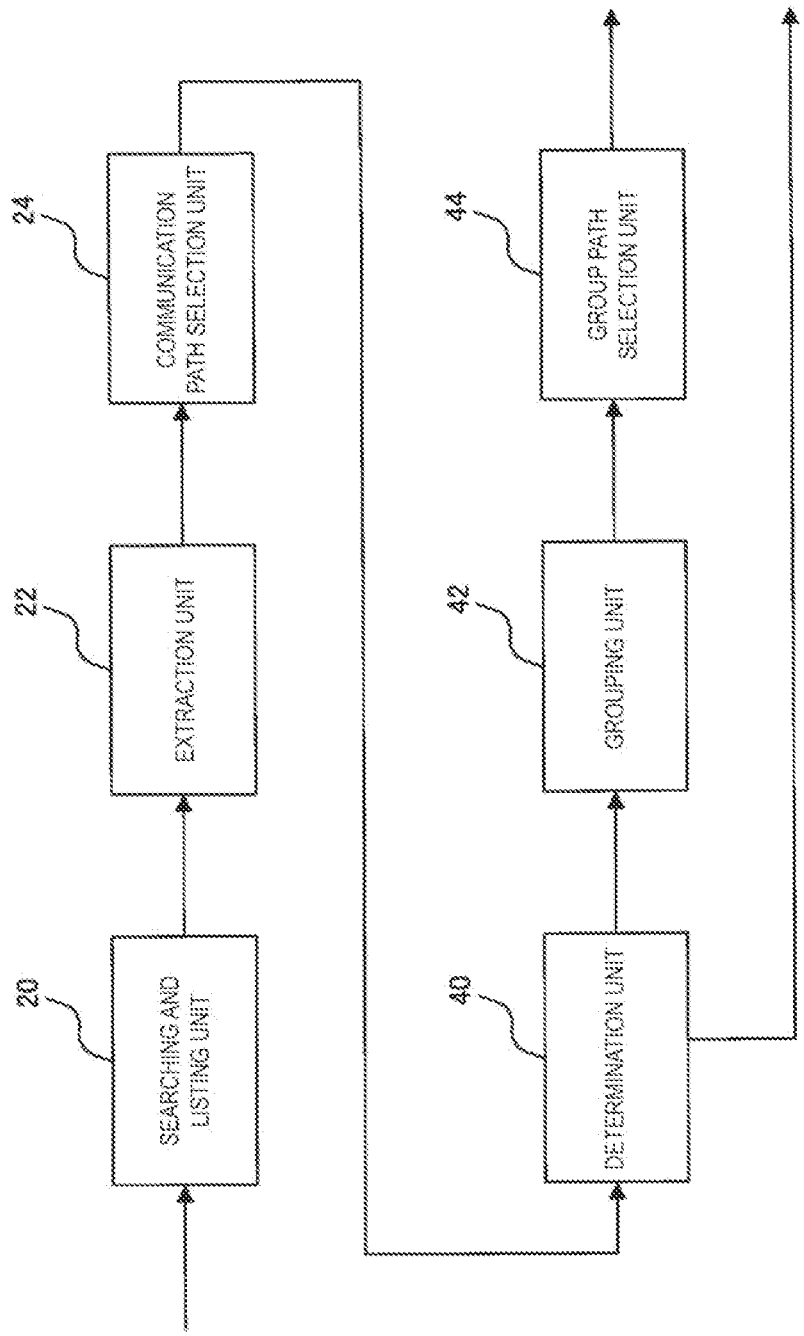
FIG. 8 is a diagram illustrating functions of the path control device.

FIG. 8 illustrates functions of the path control device 32. As illustrated in FIG. 8, the path control device 32 includes a searching and listing unit 20, an extraction unit 22, a communication path selection unit 24, a determination unit 40, a grouping unit 42, and a group path selection unit 44.

In a case where the communication path selection unit 24 selects combinations of a plurality of communication paths, the determination unit 40 determines whether or not a maximum value of the number of communications passing through the same output port of the signal transfer device is 1.

In a case where the determination unit 40 determines that a maximum value of the number of communications is not 1, the grouping unit 42 groups available communication paths between each of the wireless devices belonging to a common wireless control device and the common wireless control device by each wireless control device.

The group path selection unit 44 selects a combination of communication paths in which a maximum value of the number of groups of communication paths passing through the same output port of the signal transfer device is minimized.

Specifically, the path control device 32 sets communications having a common wireless control device as the same group in communications between wireless devices and wireless control devices. This is because, in a case where a wireless control device has one input/output port, signals from a wireless device (uplink signals) can only pass through the same output port in the last SW before the wireless control device. Output signals to the wireless device (downlink signals) necessarily pass through the same output port when the output signals are output from the wireless control device.

On the other hand, in a case where a wireless control device has two or more input/output ports, even communications having the same wireless control device do not necessarily pass through the same output port of the same SW. In this case, when a different port of a wireless control device is treated as another wireless control device, it is possible to perform processing as in a case where the number of input/output ports of a wireless control device is one.

Here, any communication between a wireless device and a wireless control device which is performed using a plurality of input/output ports of the wireless control device is not normally performed in L2 network in order not to cause order reversal of frames, and thus such communication is not envisioned in the present disclosure.

Note that the functions of the path control device 32 may be mounted at any one of the units constituting the wireless communication network 30 or may be mounted to be distributed among the units constituting the wireless communication network 30. For example, the functions of the path control device 32 may be mounted in any one of the wireless control devices S1 and S2 or may be realized by a plurality of components.

Figure 9:
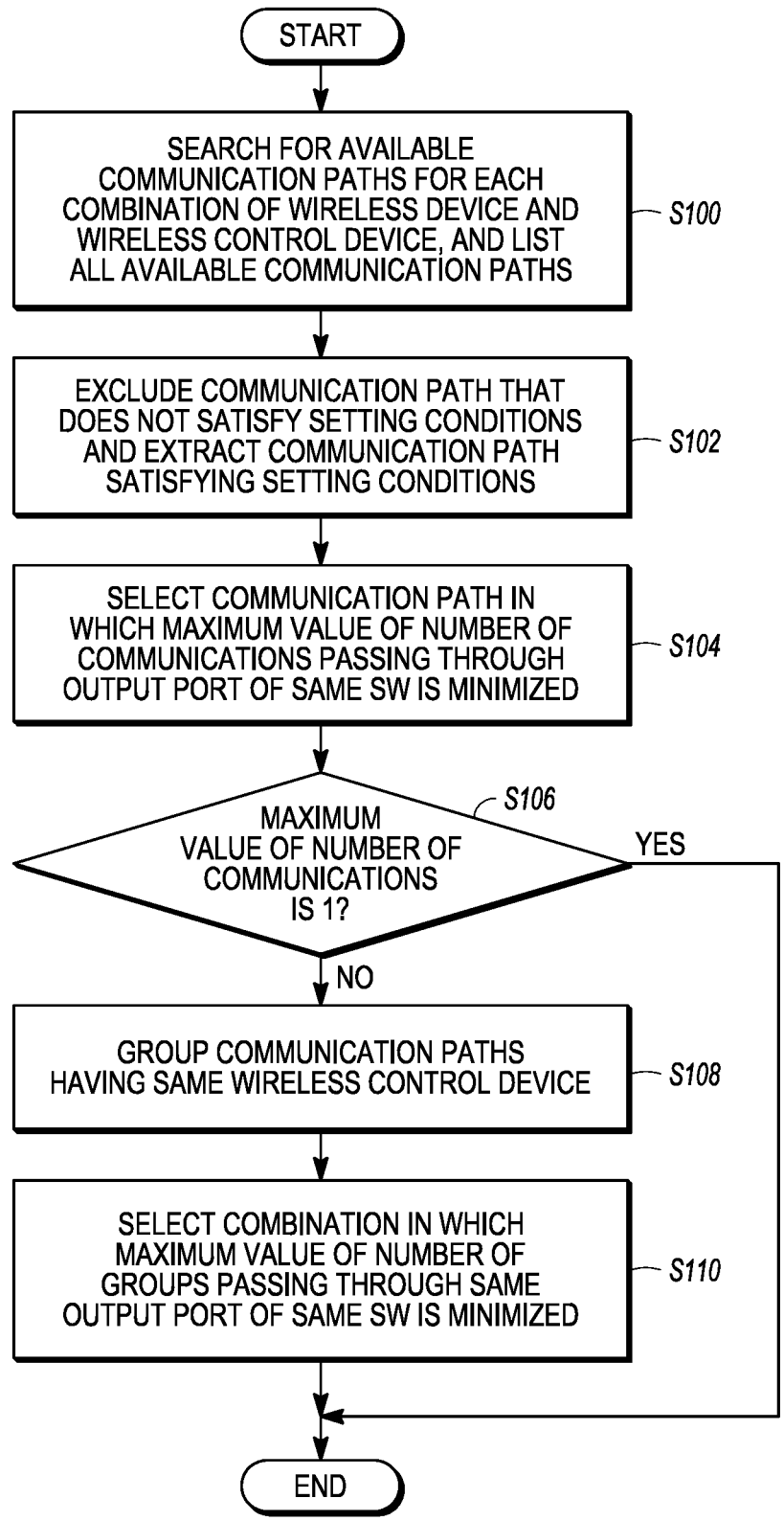
FIG. 9 is a flowchart illustrating an example of a method in which the path control device selects a communication path.

FIG. 9 illustrates an example of a method in which the path control device 32 selects a communication path. As illustrated in FIG. 9, in the path control device 32, in step 106 (S106), the determination unit 40 counts the number of communications passing through the same output port of the same SW for each communication path selected through step 100 (S100) to step 104 (S104), and determines whether or not the counted value is 1.

In a case where the result of the determination is 1, the determination unit 40 selects any one of combinations of paths in which the number of communications passing through the same output port of the same SW is 1, and terminates the processing. Further, in a case where the result of the determination is a number other than 1, the determination unit 40 outputs a combination of a plurality of communication paths selected by the communication path selection unit 24 to the grouping unit 42.

In step 108 (S108), the grouping unit 42 groups available communication paths between each of the wireless devices belonging to a common wireless control device and the common wireless control device by each wireless control device.

In step 110 (S110), the group path selection unit 44 counts the number of groups passing through the same output port of the same SW among combinations of paths selected by the communication path selection unit 24, selects any one of the combinations in which the number of groups is minimized as a communication path, and terminates the processing.

Note that the group path selection unit 44 may select a combination of communication paths in which a maximum value of a high priority signal transmittable period in communication passing through the same output port of L2-SW (1) to L2-SW(11) is minimized. For example, in a case where the length of a high priority signal transmittable period is different for each combination of a wireless device and a wireless control device, the group path selection unit 44 may select a combination in which a maximum value of a high priority signal transmittable period passing through the same output port of the same SW is minimized.

FIG. 10 illustrates a process of selecting a communication path in the path control device 32. That is, FIG. 10 illustrates combinations of communication paths that can be selected in the wireless communication network 30 by the path control device 32 and selection results of a communication path. Here, a communication path in which the number of hops is 8 or greater is not described.

As described above, in the wireless communication network 30, the wireless device A communicates with the wireless control device S1, the wireless device B communicates with the wireless control device S2, and the wireless device C communicates with the wireless control device S1. For example, first, the path control device 32 searches for available communication paths for each combination of a wireless device and a wireless control device, and lists all of the available communication paths. In this example, it is assumed that three communication paths are available between the wireless device A and the wireless control device S1, three communication paths are available between the wireless device B and the wireless control device S2, and two communication paths are available between the wireless device C and the wireless control device S1, these communication paths having no more than 7 hops.

Secondly, the path control device 32 excludes a communication path that does not satisfy preset setting conditions from the listed communication paths and extracts a communication path satisfying the setting conditions. In this example, it is assumed that an upper limit of the number of hops is 6, and a communication path in which the number of hops is 7 or greater is excluded ("Excluded" in FIG. 10 indicates the corresponding location).

In addition, thirdly, the path control device 32 calculates a maximum value of the number of communications passing through the same output port of the same SW and selects a combination in which the calculated value is minimized. In this example, a value for minimizing a maximum value of the number of communications passing through the same SW output port is 2, and thus a combination in which a maximum value of the number of communications passing through the same SW output port is 3 is excluded ("Fair" in FIG. 10 indicates the corresponding location).

In this case, in a path control device that does not include the determination unit 40, the grouping unit 42, and the group path selection unit 44 as in the path control device 12, one communication path is selected from among combinations ("Good" and "Very Good" in FIG. 10 indicate the corresponding locations) in which a maximum value of the number of communications passing through the same SW output port is minimized (the value is 2).

On the other hand, the path control device 32 includes the determination unit 40, the grouping unit 42, and the group path selection unit 44, and the grouping unit 42 groups communication paths having a common wireless control device. In the example illustrated in FIG. 10, a set of the wireless device A and the wireless control device S1 and a set of the wireless device C and the wireless control device S1 belong to the same group (first group), and a set of the wireless device B and the wireless control device S2 belong to another group (second group).

Next, in the path control device 32, the group path selection unit 44 calculates a maximum value of the number of groups passing through the same output port of the same SW for individual combinations ("Good" and "Very Good" in FIG. 10 indicate the corresponding locations) in which a maximum value of the number of communications passing through the same output port of the same SW is minimized (the value is 2). Then, the group path selection unit 44 selects a combination in which the number of groups passing through the same SW output port is minimized (here, the value is 1).

Figure 11:
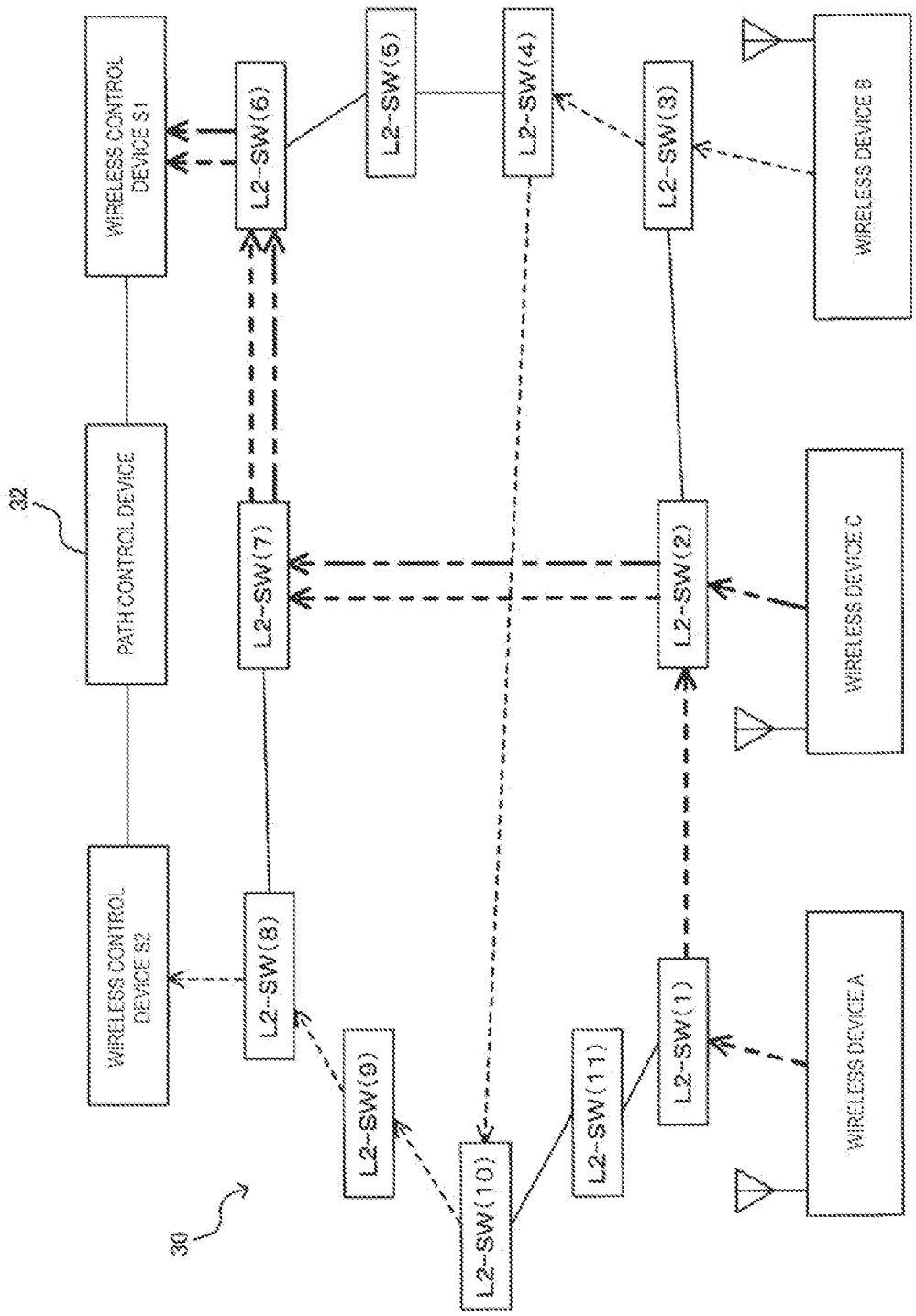
FIG. 11 is a diagram illustrating an example in which the path control device selects a communication path in a wireless communication network.
Figure 12:
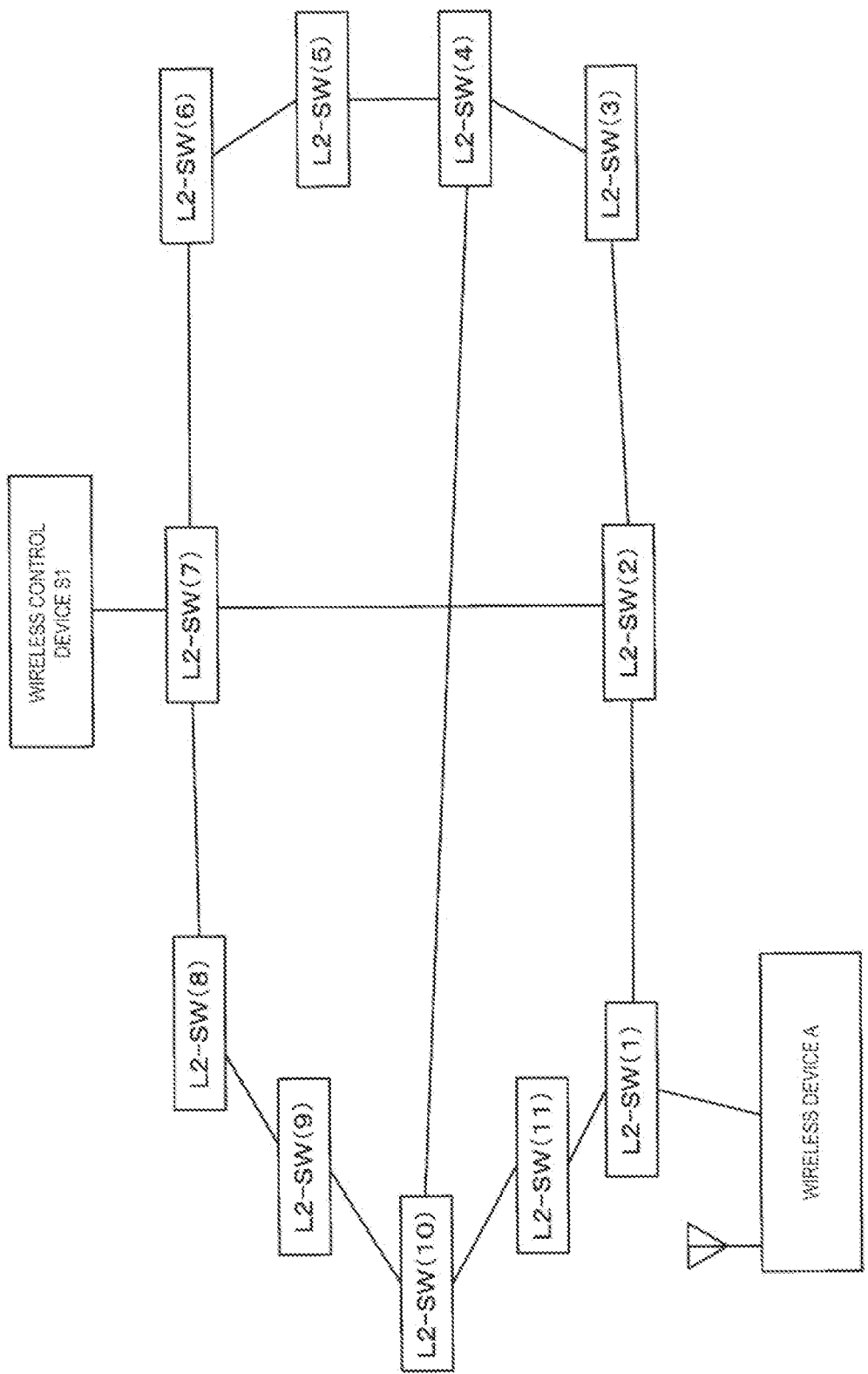
FIG. 12 is a diagram illustrating an example in which one wireless device A and one wireless control device S1 are accommodated in L2NW.

FIG. 11 illustrates an example in which the path control device 32 selects a communication path in the wireless communication network 30. A communication path of A→SW1→SW2→SW7→SW6→S1 is selected between the wireless device A and the wireless control device S1, a communication path of B→SW3→SW4→SW10→SW9→SW8→S2 is selected between the wireless device B and the wireless control device S2, and a communication path of C→SW2→SW7→SW6→S1 is selected between the wireless device C and the wireless control device S1.

In this manner, delay in a network can be reduced by selecting a combination of communication paths in which a maximum number of the number of groups of communication paths passing through the same output port of a signal transfer device is minimized.

As described above, according to the path control device 12 or the path control device 32 according to the embodiment, delay in a network can be reduced. Note that the functions of the path control device 12 or the path control device 32 may be implemented by dedicated hardware, or may be implemented as a program on general-purpose hardware having functions of a computer including a CPU.

That is, the functions of the path control device 12 or the path control device 32 according to the present disclosure can also be realized by a computer and a program, and the program can also be recorded in a recording medium and provided through a network.

REFERENCE SIGNS LIST 10, 30 Wireless communication network
12, 32 Path control device
20 Searching and listing unit
22 Extraction unit
24 Communication path selection unit
40 Determination unit
42 Grouping unit
44 Group path selection unit

The invention claimed is:
1. A path control method of controlling a communication path in a network including a plurality of wireless devices communicating with a terminal in a wireless manner and a plurality of wireless control devices communicating with any one of the plurality of wireless devices through a plurality of signal transfer devices, the path control method comprising:
- searching for available communication paths and listing the available communication paths for individual combinations of a wireless device of the plurality of wireless devices and a wireless control device of the plurality of wireless control devices;
- selecting a combination of communication paths in which a maximum value of the number of communications passing through the same output port of a signal transfer device of the plurality of signal transfer devices is minimized from among the listed available communication paths; and
- grouping the available communication paths between each wireless device belonging to a common wireless control device and the common wireless control device, for each wireless control device in a case where it is determined that the maximum value of the number of communications passing through the same output port of a signal transfer device of the plurality of signal transfer devices is not 1.

2. The path control method according to claim 1, further comprising:
- determining whether or not the maximum value of the number of communications passing through the same output port of a signal transfer device of the plurality of signal transfer devices is 1 in a case where a plurality of combinations of communication paths is selected from among the listed available communication paths; and
- selecting a combination of the communication paths in which the maximum value of the number of groups of the available communication paths passing through the same output port of a signal transfer device of the plurality of signal transfer devices is minimized.

3. The path control method according to claim 1, wherein each signal transfer device periodically switches between a high priority signal transmittable period in which a high priority signal is transmittable and a low priority signal transmittable period in which a low priority signal is transmittable.

4. A path control method of controlling a communication path in a network including a plurality of signal transfer devices periodically switching between a high priority signal transmittable period in which a high priority signal is transmittable and a low priority signal transmittable period in which a low priority signal is transmittable, a plurality of wireless devices communicating with a terminal in a wireless manner, and a plurality of wireless control devices communicating with any one of the plurality of wireless devices through the signal transfer devices, the path control method comprising:
- searching for available communication paths and listing the available communication paths for individual combinations of a wireless device of the plurality of wireless devices and a wireless control device of the plurality of wireless control devices; and
- selecting a combination of communication paths in which a maximum value of the high priority signal transmittable period in communication passing through the same output port of a signal transfer device of the plurality of signal transfer devices is minimized, from among the listed available communication paths;
- grouping the available communication paths between each wireless device belonging to a common wireless control device and the common wireless control device, for each wireless control device in a case where it is determined that a maximum value of the number of communications passing through the same output port of a signal transfer device of the plurality of signal transfer devices is not 1; and
- selecting a combination of the communication paths in which a maximum value of the number of groups of the available communication paths passing through the same output port of a signal transfer device of the plurality of signal transfer devices is minimized.

5. A path control device for controlling a communication path in a network including a plurality of wireless devices communicating with a terminal in a wireless manner and a plurality of wireless control devices communicating with any one of the plurality of wireless devices through a plurality of signal transfer devices, the path control device comprising:
- a processor; and
- a storage medium having computer program instructions stored thereon, when executed by the processor, perform to:
  - search for available communication paths and list the available communication paths for individual combinations of a wireless device of the plurality of wireless devices and a wireless control device of the plurality of wireless control devices
  - select a combination of communication paths in which a maximum value of the number of communications passing through the same output port of a signal transfer device of the plurality of signal transfer devices is minimized from among the available communication paths listed; and
  - group the available communication paths between each wireless device belonging to a common wireless control device and the common wireless control device, for each wireless control device, in a case where it is determined that the maximum value of the number of communications passing through the same output port of a signal transfer device of the plurality of signal transfer devices is not 1.

6. The path control device according to claim 5, wherein the computer program instructions further perform to determine whether or not the maximum value of the number of communications passing through the same output port of a signal transfer device of the plurality of signal transfer devices is 1 in a case where a plurality of combinations of the communication paths are selected;
and
select a combination of the communication paths in which a maximum value of the number of groups of the available communication paths passing through the same output port of a signal transfer device of the plurality of signal transfer devices is minimized.

7. The path control device according to claim 5, wherein each signal transfer device periodically switches between a high priority signal transmittable period in which a high priority signal is transmittable and a low priority signal transmittable period in which a low priority signal is transmittable.

* * * * *